Sept. 25, 1928.
W. H. POWELL
1,685,752
DYNAMO ELECTRIC MACHINE AND WINDING THEREFOR
Filed July 29, 1926
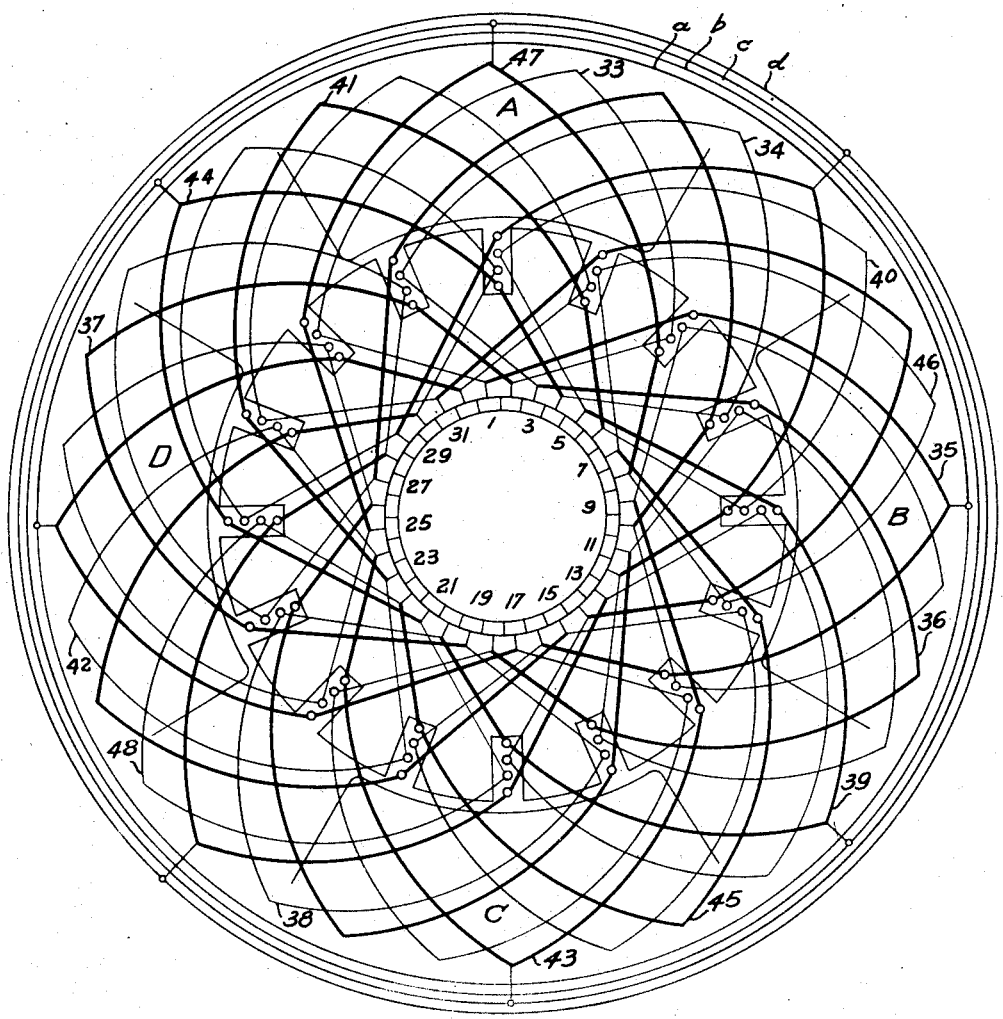

Patented Sept. 25, 1928.

1,685,752

UNITED STATES PATENT OFFICE.

WILLIAM H. POWELL, OF WAUWATOSA, WISCONSIN, ASSIGNOR TO ALLIS-CHALMERS MANUFACTURING COMPANY, OF MILWAUKEE, WISCONSIN, A CORPORATION OF DELAWARE.

DYNAMO-ELECTRIC MACHINE AND WINDING THEREFOR.

Application filed July 29, 1926. Serial No. 125,666.

This invention relates to dynamo-electric machines and windings therefor.

In ordinary lap windings providing a number of circuits equal to the number of poles each circuit is influenced by but one pair of poles. While in simple wave windings each circuit is influenced by all of the poles such windings, on the other hand, provide no more than two circuits no matter what the number of poles may be. If more circuits are desired difficulties are usually experienced unless elaborate external cross connectors are employed inasmuch as each circuit will not carry its proportional share of the load. In applicant's copending application S. N. 713,723, filed May 16, 1924, now Patent No. 1,628,611, issued May 10, 1927, it has been shown how, among other things, lap windings and wave windings may be successfully equalized without the use of external cross connectors. Occasions at times arise either in small or large machines when it may become advisable to reduce the number of separately insulated conductors per slot on account of the space factor. It is one of the objects of the present invention to provide windings in which the hereinbefore mentioned difficulties are avoided.

Another object of the invention is to provide a winding in which the number of circuits is more than in a simple wave winding and at least equal to the number of circuits provided by a simple lap winding and in which the respective circuits are influenced by more than one pair of poles.

Still another object is to provide a winding in which more commutator bars than in a simple wave winding may be employed whereby the division of electromotive forces at the commutator is more efficiently attained.

A further object is to provide a winding for rotary converters or other machines utilizing slip rings connected to the winding, in which the circuits are efficiently equalized and more specifically in which circuits between predetermined slip rings are influenced by more than one pair of poles and generate substantially equal electromotive forces. Other objects will appear as the description of the invention proceeds.

The novel features of the invention will appear from this specification and the accompanying drawing forming part thereof and showing one embodiment of the invention, and all these novel features are intended to be pointed out in the claims.

The single figure of the drawing is a diagrammatic representation of a dynamo-electric machine with its armature winding, embodying the invention.

Referring to the drawing the machine here shown is provided with four poles A, B, C, D. The armature is here shown as provided with 32 commutator bars and with 16 slots. In the slots are disposed lap coils and wave coils connected as hereinafter described. For example, commutator bars 1 and 2 have connected thereto the front end connections of a lap coil 33 and commutator bars 3 and 4 have connected thereto, in like manner, lap coil 34. It will be noted that there is no lap coil connected to bars 2 and 3 as in the usual form of lap winding. Stated in other words, each pair of bars has but one lap coil connected thereto so that while there are 32 commutator bars there are only 16 lap coils.

Considering the wave coils, commutator bars 1 and 16, for example, have connected thereto a wave coil 35. It will be noted that the pitch of the wave coils is 15 bars and that there are 16 wave coils. The commutator pitch of the wave coils is calculated the same as though it were to be for a wave winding comprising a number of coils equal to the total number of coils on the armature, namely, 32 coils, to provide 4 circuits, there being in the illustrated machine 4 poles. In other words, the commutator pitch of the wave coils is made one bar less or greater than the number of bars per pair of poles. The lesser value is chosen when the lap coils are progressive and the greater when they are retrogressive.

In order to further elucidate the nature of the winding, an armature circuit will be traced. For example, if we start at bar 1 we may trace through lap coil 33 to bar 2, through a wave coil 37 to bar 19 through a lap coil 38 to bar 20, through a wave coil 39 to bar 5 through a lap coil 40 to bar 6 through a wave coil 41 to bar 23, through a lap coil 42 to bar 24 through a wave coil 43 to bar 9. If bar 1 is positive then bar 9 will be negative. It will be noted that the armature circuit just traced is influenced by all of the poles. In like manner three other armature circuits may be traced, namely, from bar 1 to bar 25 from bar 17 to bar 9 and from bar 17 to bar 25. Each of these 4 circuits is influenced by all of the poles.

The illustrated machine is here shown as provided with 4 slip rings $a$, $b$, $c$, $d$ to adapt it for use, if desired, as a 2 phase rotary converter. In the particular machine shown each ring is provided with 2 taps to the armature winding at diametrically opposite points. In order to show that predetermined circuits between predetermined rings are influenced by all of the poles and are disposed to generate equal E. M. F's. a pair of such circuits will be traced. For example, starting at ring $c$ which has a tap connection to wave coil 43, we may trace through one half of this wave coil to bar 24 and from there through lap coil 42 to bar 23 through wave coil 41 to bar 6 through lap coil 40 to bar 5 and through one half of wave coil 39 to the ring $b$. From ring $b$ we may also trace through one half of a wave coil 44 to bar 21 through a lap coil 48 to bar 22 through a wave coil 45 to bar 7 through a lap coil 46 to bar 8 through one half of a wave coil 47 to ring $c$. It will be noted that each of these circuits between rings $b$ and $c$ is influenced by all of the poles and the coils are so disposed as to generally equal E. M. F.'s. The first circuit traced is part of the armature circuit extending from bar 1 to bar 9 and the second circuit traced is a part of the armature circuit extending from bar 17 to bar 25.

It is of course clear that the invention may be applied in machines having any desired number of poles, slots, bars, coils, etc.

It should be understood that it is not desired to limit the invention to the exact details of construction shown and described, for obvious modifications may occur to persons skilled in the art.

It is claimed and desired to secure by Letters Patent:

1. In a multipolar dynamo-electric machine an armature provided with means including a commutator and a winding providing a number of circuits equal to the number of poles, there being one circuit only between each pair of points of opposite sign on said commutator and each of said circuits being influenced by all of the poles of said machine.

2. In a multipolar dynamo-electric machine, an armature having a commutator, said armature being provided with a winding including a predetermined number of lap and wave wound coils connected to said commutator, said commutator having a number of bars equal to the total number of coils.

3. In a multipolar dynamo-electric machine, a commutator type armature provided with a winding including a predetermined number of lap coils and wave coils the commutator pitch of the wave coils being equal to the number of commutator bars per pair of poles minus one or plus one according to whether the lap coils are progressive or retrogressive respectively, a predetermined number of commutator bars having connected thereto one lap coil and one wave coil terminal only.

4. In a multipolar dynamo-electric machine, an armature having a commutator, said armature being provided with a winding one half of the coils of which are lap wound and the other half wave wound, said commutator having a number of bars equal to the total number of coils.

5. In a multipolar dynamo-electric machine, a slotted armature having a commutator, said armature being provided with a winding one half of the coils of which are lap wound and the other half wave wound, the number of slots being equal to one half the total number of coils and said commutator having a number of bars equal to the total number of coils.

6. In a multipolar dynamo-electric machine, a commutator type armature provided with a winding having a predetermined number of lap wound coils less than the number of commutator bars, and a predetermined number of wave wound coils for interconnecting said lap coils to form a continuous winding.

7. In a multipolar dynamo-electric machine, a commutator type armature provided with a winding including one half as many lap wound coils as commutator bars, the terminals of any given lap coil being connected to two adjacent commutator bars respectively, each commutator bar having but one lap coil terminal connected thereto, and one half as many wave wound coils as commutator bars, having a commutator pitch equal to the number of bars per pair of poles minus or plus one according to whether the lap coils are progressive or retrogressive.

8. In a multipolar dynamo-electric machine, an armature provided with a commutator and with a predetermined number of slip rings and with a winding providing a number of circuits at the commutator equal to the number of poles, said winding providing a predetermined number of paths between certain of said rings each of said predetermined number of paths between said certain rings having conductors disposed under all of said poles in a predetermined position of the armature.

In testimony whereof, the signature of the inventor is affixed hereto.

WILLIAM H. POWELL.